Aug. 30, 1955 L. E. NORTON 2,716,704

FREQUENCY STABILIZATION OF OSCILLATORS

Filed May 25, 1950 2 Sheets-Sheet 1

INVENTOR
Lowell E. Norton
BY J. L. Whittaker
ATTORNEY

INVENTOR
Lowell E. Norton
BY
J. L. Whittaker
ATTORNEY

United States Patent Office 2,716,704

Patented Aug. 30, 1955

2,716,704

FREQUENCY STABILIZATION OF OSCILLATORS

Lowell E. Norton, Princeton, N. J., assignor to Radio Corporation of America, a corporation of Delaware Application May 25, 1950, Serial No. 164,053

The terminal fifteen years of the term of the patent to be granted has been disclaimed 9 Claims. (Cl. 250—36)

This invention relates to methods and systems for stabilizing the frequency of oscillators, particularly microwave oscillators including glystrons, magnetrons and the like.

In accordance with the present invention, which in some respects is an improvement upon that disclosed in my copending application Serial No. 29,836, now abandoned, the generated oscillations are transmitted in paths having different time delay characteristics and then mixed to produce a component of low frequency dependent upon the rate of phase change of the oscillations. The oscillations delayed in one path are also shifted 90° electrically and then mixed with oscillations transmitted in the other path so to produce a second component of the same low frequency as the first. The phase relation of the two low frequency components reverses upon change in sign of the frequency deviations of the oscillator.

Further and more specifically, the two low frequency components appearing in the outputs of two mixers are impressed upon a phase or coincidence detector to produce a control voltage of sense dependent upon their phase relation and which, for automatic frequency stabilization, may be applied to the frequency control electrode of the oscillator tube or for a control tube therefor.

More specifically, the low frequency component of the output of one of the mixers is applied as a sinusoidal voltage to one input circuit of the phase-comparator and the low frequency component of the other mixer is converted to square-wave push-pull pulses which are differentiated and applied as sharp pulses of opposite polarity to another input circuit of the phase comparator. The output voltage of the phase comparator is a unidirectional voltage which reverses in polarity upon reversal in the phase relation of the two low frequency components of the output of the mixers applied as aforesaid to respective input circuits of the phase comparator.

The invention further resides in methods and systems having features of novelty and utility hereinafter described and claimed.

For a fuller and more detailed understanding of the invention, reference is made to the accompanying drawings, in which.

Figures 1, 2, 3A, 3B:
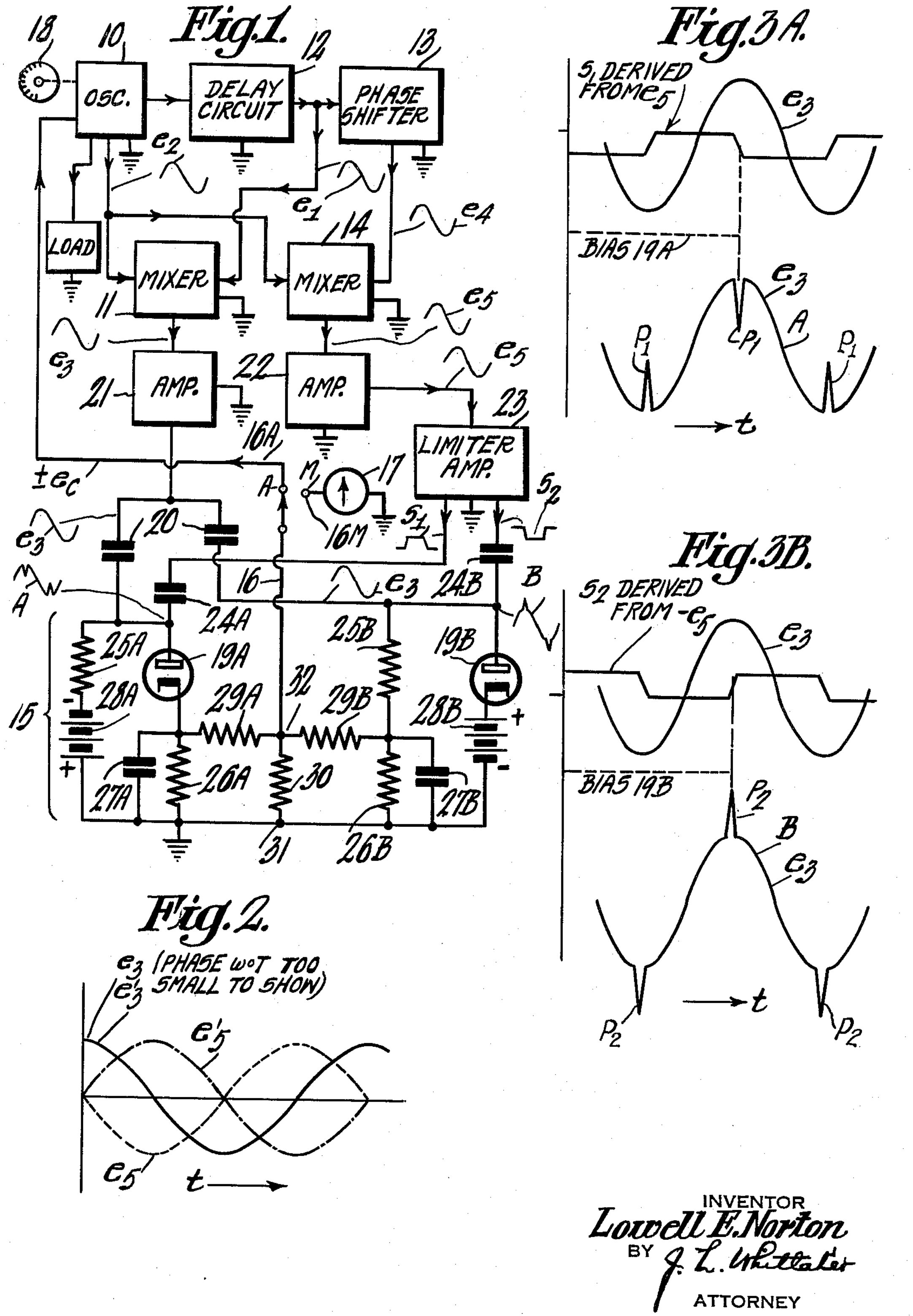
Fig. 1 is a block diagram schematically illustrating a frequency stabilizing system embodying the invention.
Fig. 2 is an explanatory figure referred to in discussion of the operation of Fig. 1.
Figs. 3A and 3B are explanatory figures referred to in discussion of the phase-comparatory of Fig. 1.

Referring to Fig. 1, the output of the oscillator 10, whose frequency is to be stabilized, is transmitted in two separate paths and applied to a mixer 11 of any suitable type. One of the paths includes a delay circuit 12 so that the oscillations transmitted through the delay circuit 12 as impressed upon mixer 11 were generated prior to the oscillations transmitted to the mixer in the other path.

The delayed oscillations are also impressed upon a phase shifter 13 of suitable type which shifts them in phase by 90°. The output of the phase shifter is applied to a second mixer 14 upon which is also impressed the oscillations generated by oscillator 10 and applied to mixer 11 without delay or with delay which is different from that afforded by delay circuit 12.

As hereinafter more specifically discussed, the output of the mixers 11 and 14 each includes a component of frequency corresponding with a low frequency component of the output of the other mixer. The phase relation of these two low frequency components is of one sign or the other dependent upon the sense in which the frequency of oscillator 10 is changing from its initial frequency. By observing the phase relations of these two low frequency components, as on an oscilloscope screen, an operator, by adjustment of a frequency control 18 of the oscillator 10, may hold the oscillator frequency at desired value, alternately, the two low frequency components may be applied in a two channel servo-system automatically to stabilize the frequency of the oscillator 10. The frequency control 18 may be for adjusting a tuning condenser or inductance; in the case of a klystron, for adjusting cavity dimensions; or for changing the operating potential of a frequency control electrode of the oscillator tube or of an associated control or reactance tube.

In explanation of the foregoing, the output of the delay circuit 12 may be expressed as:

(1) $$e_1=E_1 \sin (\omega_0 t+\psi \sin pt)$$

where $E_1$=peak value $p$=rate of phase change $\frac{\omega_0}{2\pi}$=initial frequency $\psi$=maximum phase displacement $t$=time and the output of the oscillator 10 may be expressed as:

(2) $$e_2=E_2 \sin \{\omega_0(t-T)+\psi \sin p[(t-T)]\}$$

where $T$=group velocity delay of the delay circuit.

As above explained, these two signals are applied in one channel to the mixer 11. The output of mixer 11 in addition to the original signals $e_1$ and $e_2$ also includes a low-frequency component of the cross product $2e_1e_2$. This low frequency component or term may be written as:

(3) $$e_3=E_3 \cos \left\{\omega_0 T+2\psi \sin p\frac{T}{2} \cos \left[p\left(t-\frac{T}{2}\right)\right]\right\}$$

In the second channel, the output of the phase shifter 13 may be written as:

(4) $$e_4=E_4 \cos (\omega_0 t+\psi \sin pt)$$

and the oscillator output is, as before, $$e_2=E_2 \sin \{\omega_0(t-T)+\psi \sin [p(t-T)]\}$$

As above explained, these two signals are applied to the second mixer 14 whose output in addition to including the signals or terms $e_2$ and $e_4$ also includes a low frequency component of the cross product term $2e_4e_2$ which may be written as (5)
$$e_5=-E_5 \sin \left\{\omega_0 T+2\psi \sin p\frac{T}{2} \cos \left[p\left(t-\frac{T}{2}\right)\right]\right\}$$
$$=E_5 \sin \left\{\omega_0 T+2\psi \sin p\frac{T}{2} \cos\left[p\left(t-\frac{T}{2}\right)\right]+\pi\right\}$$

As evidenced from comparison of Equations 3 and 5 the argument of the terms $e_3$ and $e_5$ are alike, however as evident from their sine and cosine relationship, the phases of $e_3$ and $e_5$, differ by 90° or $$\frac{\pi}{2}$$

Utilizing this relationship, Equation 3 may be rewritten as (6)
$$e_3=E_3 \sin \left\{\omega_0 T+2\psi \sin p\frac{T}{2} \cos \left[p\left(t-\frac{T}{2}\right)\right]+\frac{\pi}{2}\right\}$$

The phase of $e_3$, the low frequency component of the output of mixer 11, may be written as (7) $$\phi_3=\omega_0 T+2\psi \sin p\frac{T}{2} \cos \left[p\left(t-\frac{T}{2}\right)\right]+\frac{\pi}{2}$$

and the phase of $e_5$, the low frequency of the output of mixer 14, may be written as (8) $$\phi_5=\omega_0 T+2\psi \sin \frac{T}{2} \cos \left[p\left(t-\frac{T}{2}\right)\right]+\pi$$

For positive values of $p$, the rate of change of frequency of the oscillator, the phase difference between the two low frequency components of mixers 11 and 14 is $$-\frac{\pi}{2}$$

Otherwise stated if the frequency of oscillator 10 is increasing, the signal $e_3$ lags the signal $e_5$ by 90°.

If the initial rate of phase change is in the opposite direction (negative values of $p$) so as to produce a change in frequency of the ocillator in the opposite direction, $e_3$ becomes $e_3'$ which may be written as (9) $$e_3'=E_3 \sin \left\{2\psi \sin p\frac{T}{2} \cos p\left(t-\frac{T}{2}\right)-\omega_0 T+\frac{\pi}{2}\right\}$$

and $e_5'$ (the corresponding value for $e_5$) may be written as

(10) $$e_5'=E_5 \sin \left\{2\psi \sin p\frac{T}{2} \cos \left[p\left(t-\frac{T}{2}\right)\right]-\omega_0 T\right\}$$

Thus for negative values of $p$, the phase difference between the low frequency components $e_3$ and $e_5$ of the outputs of the mixers 11 and 14 is $$\frac{\pi}{2}$$

Otherwise stated, if the frequency of oscillator 10 is decreasing the signal $e_3$ leads the signal $e_5$ by 90°.

Thus, as graphically shown in Fig. 2, the quadrature phase relation between the signals $e_3$ and $e_5$ undergoes a change in algebraic sign when there is reversal of the rate of phase change of the frequency of oscillator 10.

To produce a unidirectional voltage $e_c$ which changes in polarity upon reversal of the phase relations between the low frequency components $e_3$ and $e_5$, the output of the mixers 11 and 14 may be impressed upon the input circuits of known types of phase comparators or coincidence detectors including those shown in copending applications Serial Nos. 4,497 and 35,185. The unidirectional output voltage produced by the phase comparator may be applied to a meter 17, such as a vacuum-tube voltmeter, whose reading will indicate to an operator whether the frequency of oscillator 10 is rising or falling whereupon the operator may adjust a frequency control 18 of the oscillator to minimize the frequency deviation or return the oscillator frequency to desired value. Preferably however, the unidirectional control voltage is applied, as by line 16A, to a frequency control electrode of the oscillator tube or of a control tube associated therewith.

In the particular form shown in Fig. 1, the phase comparator or coincidence detector comprises a pair of rectifiers, specifically diodes 19A, 19B. The diodes are coupled as by capacitors 20, 20 to the mixer 11, preferably through an intervening electronic amplifier 21, for impression upon them of the low frequency component $e_3$.

The low frequency component $e_5$ in the output of the mixer 14 is preferably amplified by amplifier 22 and then applied to a limiter amplifier 23, or equivalent, having a push-pull output circuit, to convert the sine-wave input $e_5$ to pairs of square wave pulses $S_1$, $S_2$ which are in phase opposition. These square wave impulses are differentiated by the differentiating circuits 24A, 25A and 24B, 25B respectively associated with the diodes 19A and 19B, to produce sharp pulses $P_1$, $P_2$ which are superimposed upon the sinusoidal voltages $e_3$ impressed upon the diodes (curves A and B of Figs. 3A, 3B).

The pulse output of the diode 19A is integrated in the network comprising resistor 26A and capacitor 27A. The output pulses of the diode 19B are similarly integrated in the network 26B, 27B. The two integrating circuits are respectively connected through resistors 29A and 29B to a common output resistor 30 so that the differential of the two output voltages of these networks appear between the terminals 31 and 32 of the comparator. The biasing batteries 28A and 28B, or equivalent, for the diodes are so disposed in circuit that one diode is conductive for one phase relation of the voltages $e_3$ and $e_5$ whereas the other is conductive for the opposite phase relation. Thus the polarity of the output voltage of the comparator, as appearing across resistor 30, reverses in sign upon reversal of phase relation between the low frequency components $e_3$ and $e_5$ of the mixers 11 and 14.

More specifically, if the initial frequency change is in a direction to produce the diode potential conditions illustrated by curves A and B of Figs. 3A and 3B, the biased diode **19*b* conducts in each cycle only during the period of the positive pulses $P_2$ as superimposed upon the signal $e_3$. The corresponding potential condition at the other diode 19A is shown by curve A of Fig. 3A which indicates that this diode is biased beyond conduction throughout each cycle of the combined signal. For a frequency shift in opposite direction, the potential conditions indicated are interchanged; that is, in each cycle of $e_3$ the diode 19A conducts and diode 19B does not. The direct-current output of the two diodes are jointly effective, as the above described, to produce a differential control output of reversible polarity corresponding with the sense in which the frequency of oscillator 10** is changing.

To prevent interaction between the diodes, the resistors 29A and 29B are of equal resistance value which is materially greater than the resistance of resistor 30.

The pulse and sinusoidal repetition rates of the voltages $e_3$ and $e_5$ as applied to the diodes 19A and 19B increase with increasing deviation of the oscillator frequency in either sense. By choosing suitably small time constants for the integration circuit 26A, 27A and 26B, 27B, the integrated control potential $e_c$ will increase with increasing repetition rate or frequency deviation since the pulses $P_1$ and $P_2$ occupy a progressively larger part of each cycle with increasing deviation in oscillator frequency. This control potential, for automatic control for the frequeny of oscillator 10, is applied in proper sense to reduce the frequency deviation. If the oscillator 10 is a kylstron, the control potential may be applied directly to affect the reflector electrodes or, as hereinafter described in connection with Fig. 4, may be applied to a control tube for the klystron. For lower-frequency oscillators using lumped inductance and capacity, the control potential $e_c$ may be applied to a reactance tube used, in manner known per se, to stabilize the frequency of the oscillator.

The components of the system of Fig. 1 have many forms and equivalents; for example, the push-pull square-wave limiting amplifier 23 may be replaced by a counter-circuit of type having square wave output. For low frequency oscillators any conventenional delay circuit such as one using lumped inductances and capacitances may be used for delay circuit 12. At microwave frequencies, however, it is advantageous to use special delay circuits for reasons now discussed.

From Equation 1 it is apparent that the initial frequency shift from frequency $$\frac{\omega_0}{2\pi}$$

may be expressed as $$\frac{d}{dt}(\omega_0 t+\psi \sin pt)=p\psi \cos pt \quad (11)$$

which produces voltages of the following frequencies in the output of the mixers 11 and 14

(12)

$$\frac{d}{dt}\left\{\omega_0 T+2\psi \sin p\frac{T}{2} \cos \left[p\left(t-\frac{T}{2}\right)\right]\right.$$
$$\left.=-2p\psi \sin p\frac{T}{2} \sin \left[p\left(t-\frac{T}{2}\right)\right]\right\}$$

Since the delay time T appears in the coefficient $$\sin p\frac{T}{2}$$

if this delay time is very small the output frequency from the two mixers 11 and 14 can never differ greatly from zero and design of an operative stabilizing system would be difficult. Consequently, the delay time T should be reasonably long.

The delay T for any network may be expressed as $$T=\frac{dB}{d\omega} \quad (13)$$

which is the slope of the phase-frequency characteristic, and where $$\frac{\omega}{2\pi}=\text{applied frequency}$$

To avoid complicated and large delay-network structure, the band width should be made very small. If the delay circuit is a single sharply resonant element, the delay is $$T=\frac{1}{2\Delta f}$$

where $\Delta f$ is the band width. Increased delay may be obtained by cascading several sections but in any event it is essential that $\Delta f$ be as small as possible. In microwave circuits, the narrow band equivalent of a sharply resonant or high-Q circuit may be obtained by utilizing the molecular resonance characteristic of an absorbing gas, such as ammonia. For identification of various suitable gases, and their molecularly resonant frequencies, reference may be had to copending application Serial No. 1,240.

Figure 4:
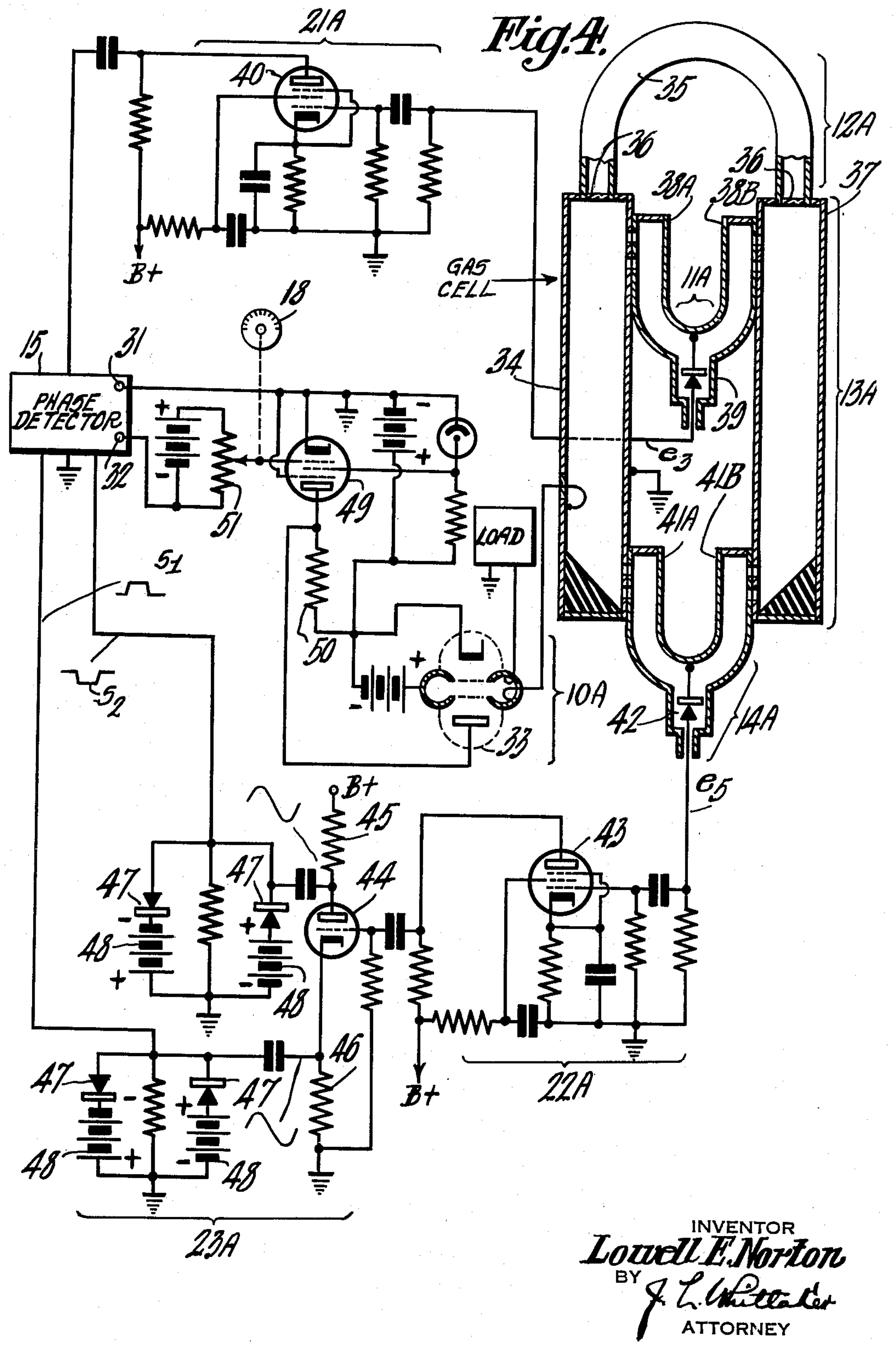
Fig. 4 schematically illustrates the stabilizing system for a microwave oscillator.

A frequency stabilizing system utilizing a microwave oscillator for the oscillation to be stabilized and a gas cell for the delay circuit is shown in Fig. 4. Elements corresponding with those of Fig. 1 are identified by the same reference characters.

The oscillator tube 33 of oscillator system 10A is a reflex klystron suitably coupled, as by a concentric line with terminating loops or probes, to a section of wave guide 34. The delay line 12A comprises a gas cell or a length of wave guide having windows 36, 36, of material, such as quartz or mica, which permits transmission of the microwave radiation but confines the gas at suitably low pressure, of the order of 0.01 millimeter or less of mercury, within the gas cell. The delay time will depend, inter alia, upon the gas and the selected absorption line thereof.

The microwave oscillations transmitted through the delay circuit 12A pass into a second length of waveguide 37 at least part of which serves as the quadrature phase shifter 13A. The mixer 11A, corresponding with mixer 11 of Fig. 1, comprises two directional couplers 38A and 38B respectively connected to the sections of wave guides 34 and 37 in advance of and beyond the delay line 12A. Thus the generated oscillations are transmitted in two paths having different time delay characteristics and impressed upon a crystal 39 or equivalent non-linear resistance of the mixer. The output of the crystal 39, includes as above described, a low frequency component $e_3$, defined in Equation 6, whose frequency increases from zero with increasing deviation, in either sense, of the oscillator frequency.

The second mixer 14A comprises directional couplers 41A and 41B respectively connected to the wave guide sections 34 and 37. The length of waveguide 37 between the directional couplers 38B and 41B is such that the oscillations respectively received thereby are in phase quadrature. The length of section of wave guide 34 between the directional couplers 38A and 41A is such that the oscillations received thereby are in phase. The output of the crystal rectifier 42 of mixer 14A includes a low frequency component $e_5$ defined by Equation 5 of the same frequency as component $e_3$ of the output of mixer 11A. The phase relations between the low frequency components $e_3$ and $e_5$ of the mixers 11A and 14B depend, as above explained in discussion of Fig. 2, upon the direction in which the frequency of the oscillator is changing; specifically, the voltage $e_5$ leads or lags the voltage $e_3$ by 90° depending upon whether the frequency of oscillator 10 is increasing or decreasing from the initial or desired value.

The output component $e_3$ of mixer 11A may be amplified by an amplifier 21A having one or more stages, exemplified by the single stage shown in Fig. 4, in which the signal $e_3$ is amplified by a tube 40 and finally impressed upon phase comparator 15. The output component $e_5$ of mixer 14A may be similarly amplified by amplifier 22A of one or more stages, each exemplified by the single stage shown in Fig. 4, in which the tube 43 amplifies the input signal $e_3$ and in amplified form impresses it upon a square wave generator, limiter amplifier 23A or the like.

In the particular form shown in Fig. 4, the output of the amplifier 22A is impressed upon a tube 44 having equal load resistors 45 and 46 in its anode and cathode circuits so to produce two amplified signals which are in phase opposition. The sinusoidal voltage produced across each of these output resistors is clipped or peak-limited, as by a network including two oppositely poled rectifiers 47, 47, each having associated therewith a biasing battery 48, or equivalent, which permits conduction when the signal voltage rises in each half cycle above a predetermined value. Thus, the sinusoidal output voltage across each of the load resistors 45, 46 is converted to a substantially flat-top or square wave, such as $S_1$, $S_2$ shown in Figs. 3A and 3B, for impression upon the corresponding input circuit of the phase comparator 15. The pulses $P_1$, $P_2$ produced by differentiation of these square waves are superimposed upon the sinusoidal wave $e_3$ from the other channel.

As above explained in discussion of Fig. 1, there thus appears across the output terminals 31—32 of the phase comparator, a unidirectional voltage $e_c$ whose polarity depends upon and is indicative of the sense in which the frequency of oscillator 10A is changing. The control voltage so produced may be applied directly or indirectly to change the potential of the reflex anode of the klystron 33.

In the particular arrangement shown in Fig. 4, the control voltage $e_c$ is applied to the signal grid of the control tube 49 for the oscillator. The anode circuit of the control tube 49 includes a resistor 50 which is common to the reflector circuit of the klystron 33. Thus the potential difference between the reflex electrode of the klystron and its cavity electrode, and hence the operating frequency of the klystron, depends upon the voltage applied to the control grid of the tube 49 which voltage includes, as a variable component, the output voltage $e_c$ of the phase comparator. This voltage may also include a normally fixed component such as derived from potentiometer 51, which may be set by the frequency-control member 13 in initial determination or readjustment of the desired operating frequency of the oscillator.

It shall be understood that the invention is not limited to the particular systems disclosed and changes and modifications may be made within the scope of the appended claims.

What is claimed is:

1. Apparatus for producing an electrical effect of sense reversing upon change in algebraic sign of the frequency deviation of an oscillator which comprises means for mixing oscillations generated by said oscillator and respectively transmitted in separate paths having different transmission-velocity characteristics so to produce a low frequency component, means for effecting quadrature phase shift of oscillations delayed in one of said paths, means for mixing the oscillations so delayed and shifted in phase with oscillations transmitted in the other of said paths to produce a second low frequency component, a phase detector, and means for impressing said low frequency components upon said phase detector to produce a unidirectional output of polarity dependent upon the phase relation of said components.

2. Apparatus for stabilizing the frequency of an oscillator which comprises means for transmitting the generated oscillations in paths having different time delay characteristics, means for mixing the oscillations so transmitted in different paths to produce a low frequency component dependent upon the rate of phase change of the oscillations, means for effecting quadrature shift of the phase of oscillations delayed in one of said paths, means for mixing the oscillations so delayed and shifted in phase with oscillations transmitted in the other of said paths to produce a low frequency component similarly dependent upon the rate of phase change of the generated oscillations, and means for varying a frequency control of said oscillator in accordance with changes in the phase relations of said components.

3. Apparatus for stabilizing the frequency of an oscillator having a frequency control which comprises a mixer, different signal paths having different time delays through each of which the oscillations are passed, means for concurrently applying to said mixer said oscillations after passage through said paths jointly to produce an alternating component dependent upon the rate of phase change of the oscillations, means for shifting by 90° the phase of oscillations after passage through one of said paths, a second mixer, means for applying the oscillations after passage through the other of said paths and the oscillations so shifted in phase to said second mixer jointly to produce an alternating component similarly dependent upon the rate of phase change of the oscillations, and means for varying said frequency control of said oscillator in accordance with the changes in the phase relations of said components.

4. Apparatus for producing a control voltage for stabilizing the frequency of an oscillator which comprises means for transmitting the generated oscillations in paths having different propagation velocities, means for mixing oscillations transmitted in the different paths to produce a low frequency component, means for effecting quadrature phase shift of the oscillations transmitted in one of said paths, means for mixing the oscillations so shifted in phase with oscillations transmitted in the other of said paths to produce a second low frequency component, a phase comparator network, and means for impressing said low frequency components upon said phase comparator network to produce a unidirectional control voltage reversing in polarity upon phase reversal of said component.

5. A circuit for use in a system for stabilizing the frequency of an oscillator, said circuit comprising two mixers, a phase detector having input circuits respectively including the output circuits of said mixers, connections for directly impressing the output of said oscillator upon the input circuits of said mixers, a delay circuit between said oscillator and one of said mixers for applying an output of said oscillator to said one mixer which output is delayed in time with respect to said directly impressed output, and a phase shifter between said delay circuit and the other of said mixers, the output of said mixers including low frequency components whose phase relation reverses upon change in sense of the frequency deviation of the oscillator.

6. A circuit as defined in claim 5 additionally including a phase detector having input circuits upon which said low frequency components are jointly impressed to produce a unidirectional output voltage of polarity reversing upon reversal in phase relation of said low frequency components.

7. A circuit as defined in claim 6 additionally including between said phase detector and one of said mixers a limiter amplifier and differentiating means for converting one of said low frequency components to a series of sharp impulses of corresponding repetition rate.

8. A circuit for use in a system for stabilizing the frequency of an oscillator, said circuit comprising a delay circuit upon which is impressed the output of said oscillator, a first mixer upon which is impressed the output of said oscillator and said delay circuit, a phase shifter upon which the output of said delay circuit is impressed, a second mixer upon which is impresed the output of said oscillator and said phase shifter, the output of said mixers including components of like frequency lower than the oscillator frequency and whose phase relation reverses upon change in sign of the frequency deviation of said oscillator, and a detector in circuit with said mixers to produce a unidirectional output of polarity dependent upon the phase relation of said lower frequency components of the mixer outputs.

9. A circuit for use in a system for stabilizing the frequency of a microwave oscillator, said circuit comprising two mixers each having two input circuits, a phase detector having input circuits upon which the output of said mixers are respectively impressed, connections for impressing the microwave oscillations upon one input circuit of each of said mixers, a chamber having therein molecularly resonant gas and in circuit between said oscillator and the second input circuit of one of said mixers, and a quadrature phase shifter between said gas chamber and the second input circuit of the other of said mixers, the output of said mixers including components of like frequency lower than the microwave oscillations and of phase reversing upon change in sign of the rate of phase change of said microwave oscillations.

References Cited in the file of this patent

UNITED STATES PATENTS

| | | |
|---|---|---|
| 2,065,565 | Crosby | Dec. 29, 1936 |
| 2,256,083 | George | Sept. 16, 1941 |
| 2,408,079 | Labin et al. | Sept. 24, 1946 |
| 2,433,350 | Earp | Dec. 30, 1947 |
| 2,434,914 | Earp | Jan. 27, 1948 |
| 2,476,311 | Learned | July 19, 1949 |
| 2,522,371 | Guanella et al. | Sept. 12, 1950 |
| 2,543,058 | Ranger | Feb. 27, 1951 |